(12) United States Patent
Szuba

(10) Patent No.: US 8,806,733 B2
(45) Date of Patent: Aug. 19, 2014

(54) METHOD OF FORMING A UNIVERSAL JOINT

(75) Inventor: Joseph Szuba, Dearborn, MI (US)

(73) Assignees: Szuba Consulting, Inc., Dearborn, MI (US); Value Extraction LLC, Dearborn, MI (US)

( * ) Notice: Subject to any disclaimer, the term of this patent is extended or adjusted under 35 U.S.C. 154(b) by 0 days.

(21) Appl. No.: 13/584,998

(22) Filed: Aug. 14, 2012

(65) Prior Publication Data

US 2013/0042459 A1 Feb. 21, 2013

Related U.S. Application Data

(60) Provisional application No. 61/524,299, filed on Aug. 16, 2011.

(51) Int. Cl.
*B23P 15/00* (2006.01)

(52) U.S. Cl.
USPC .................................. 29/415; 29/416; 29/434

(58) Field of Classification Search
CPC ...................................................... B23P 15/00
USPC .................. 29/412, 417, 505, 415, 416, 434; 403/53, 57; 464/117, 136
See application file for complete search history.

(56) References Cited

U.S. PATENT DOCUMENTS

| | | | |
|---|---|---|---|
| 2,222,762 A | 11/1940 | Debor et al. | |
| 2,275,801 A | 3/1942 | Orr et al. | |
| 2,494,128 A | 1/1950 | Holmquist et al. | |
| 2,799,084 A | 7/1957 | Debor | |
| 3,434,195 A * | 3/1969 | Ritsema | 29/437 |
| 3,501,928 A | 3/1970 | Pitner | |
| 3,564,886 A | 2/1971 | Nakamura | |
| 3,583,188 A | 6/1971 | Nakamura | |
| 3,701,564 A | 10/1972 | Puzik | |
| 3,800,383 A | 4/1974 | Khambatta et al. | |
| 4,283,824 A | 8/1981 | Schatz et al. | |
| 4,649,728 A | 3/1987 | LaCount et al. | |
| 5,188,474 A * | 2/1993 | Ohkubo et al. | 403/57 |
| 5,882,039 A | 3/1999 | Beckman et al. | |
| 5,884,722 A | 3/1999 | Durand et al. | |
| 6,006,568 A | 12/1999 | Bihrer | |
| 6,098,437 A | 8/2000 | Kocer et al. | |

(Continued)

FOREIGN PATENT DOCUMENTS

| | | |
|---|---|---|
| EP | 0913277 B1 | 5/2004 |
| JP | H06-026526 A | 2/1994 |

OTHER PUBLICATIONS

PCT/US2012/051118 International Search Report dated Oct. 24, 2012, 2 pages.

(Continued)

*Primary Examiner* — David Bryant
*Assistant Examiner* — Steven A Maynard
(74) *Attorney, Agent, or Firm* — Warner Norcross & Judd LLP

(57) ABSTRACT

A method of making a universal joint from a tube, including forming a plurality of pairs of coaxially aligned holes at longitudinally spaced locations in the tube, cutting the tube along a curvilinear cutting path around the holes forming a pair of projecting arms and U-shaped recesses between the arms forming a plurality of yokes and pivotally interconnecting the yokes using a pivot member received in the holes of adjacent yokes.

5 Claims, 2 Drawing Sheets

(56) References Cited

U.S. PATENT DOCUMENTS

| | | |
|---|---|---|
| 6,176,114 B1 | 1/2001 | Gmurowski |
| 6,189,357 B1 | 2/2001 | Baumgarten et al. |
| 6,247,346 B1 | 6/2001 | Dickson, Jr. |
| 6,261,183 B1 | 7/2001 | Duggan et al. |
| 6,666,062 B2 | 12/2003 | Dole et al. |
| 6,701,617 B2 | 3/2004 | Li et al. |
| 6,880,220 B2 | 4/2005 | Gandy |
| 7,121,128 B2 | 10/2006 | Kato et al. |
| 7,441,432 B2 | 10/2008 | Ingvarsson |
| 7,464,572 B2 | 12/2008 | Miyanaga et al. |
| 2002/0173362 A1 | 11/2002 | Sadakata et al. |
| 2005/0003897 A1* | 1/2005 | Wagner et al. ............... 464/136 |
| 2005/0028341 A1* | 2/2005 | Durand et al. ............... 29/421.1 |
| 2006/0005393 A1 | 1/2006 | Wagner et al. |
| 2007/0169530 A1 | 7/2007 | Gharib |
| 2008/0121007 A1 | 5/2008 | Ingvarsson |
| 2011/0023568 A1 | 2/2011 | Yamamoto et al. |
| 2011/0107805 A1 | 5/2011 | Lee et al. |

OTHER PUBLICATIONS

PCT/US2012/051118 Written Opinion of the International Searching Authority dated Oct. 24, 2012, 4 pages.

* cited by examiner

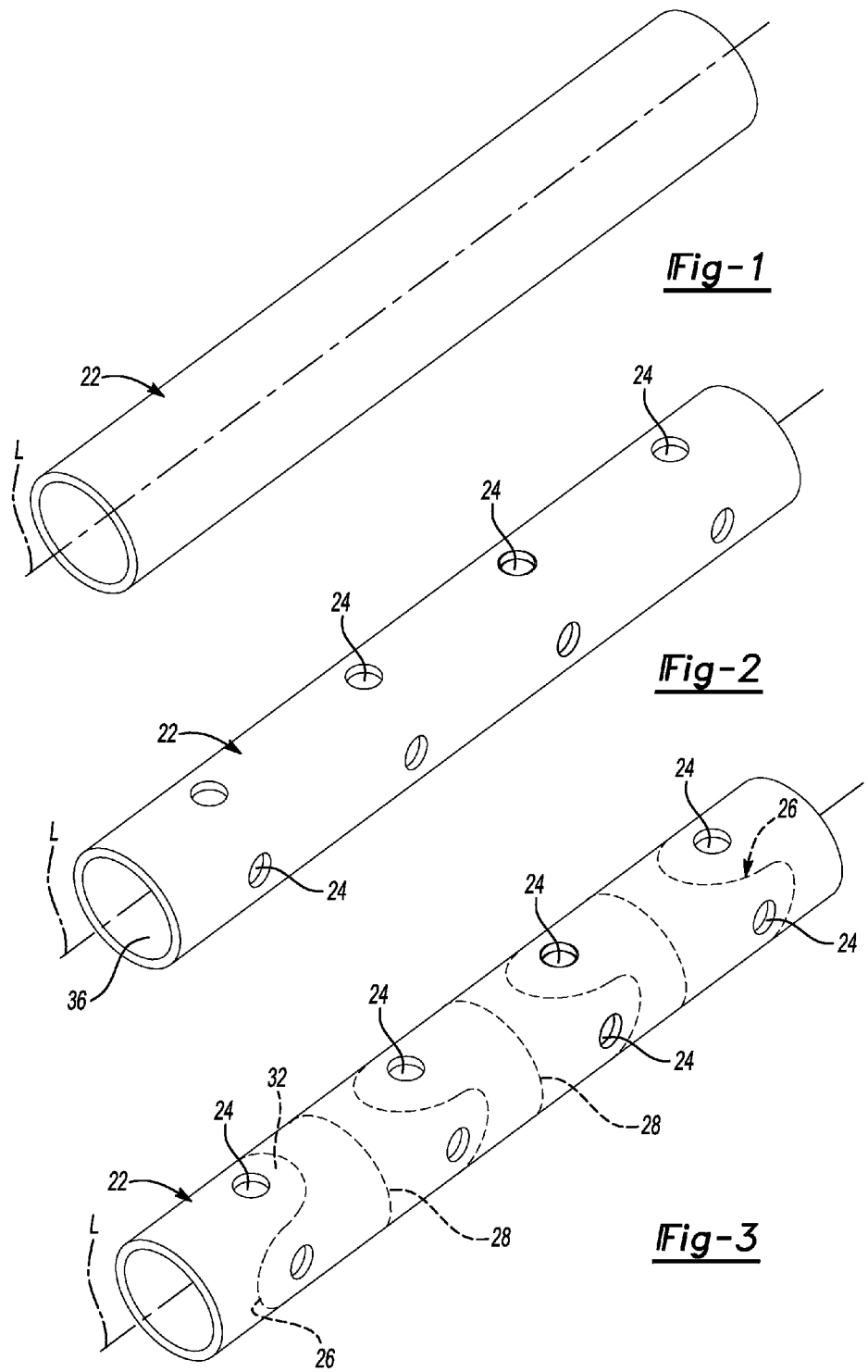

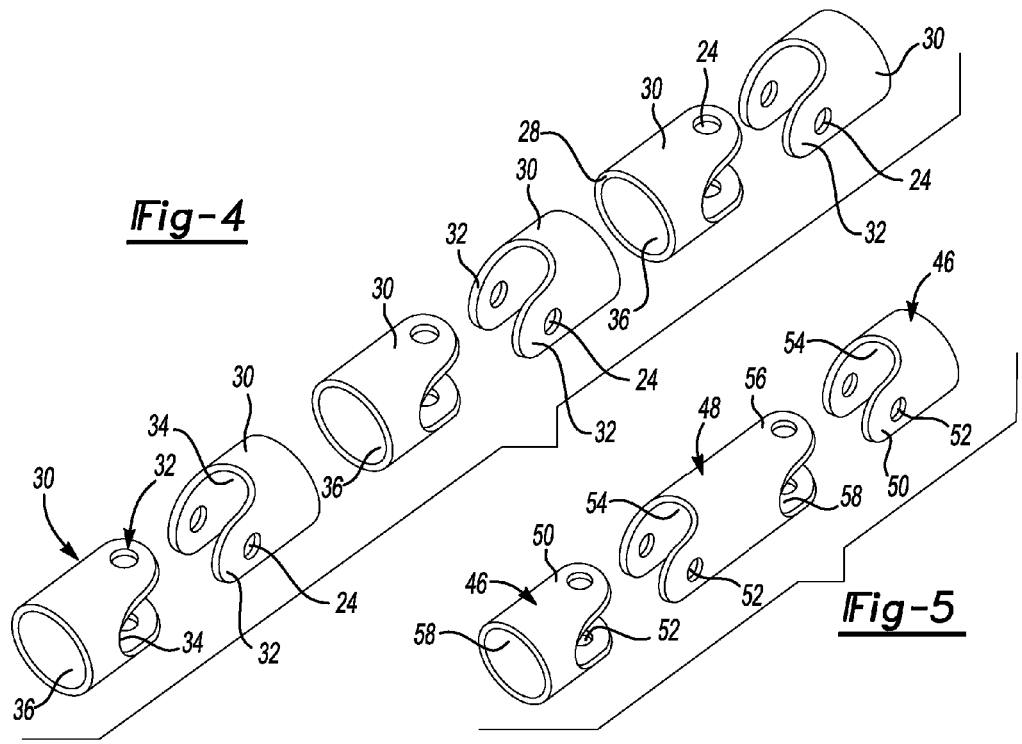
Fig-4
Fig-5
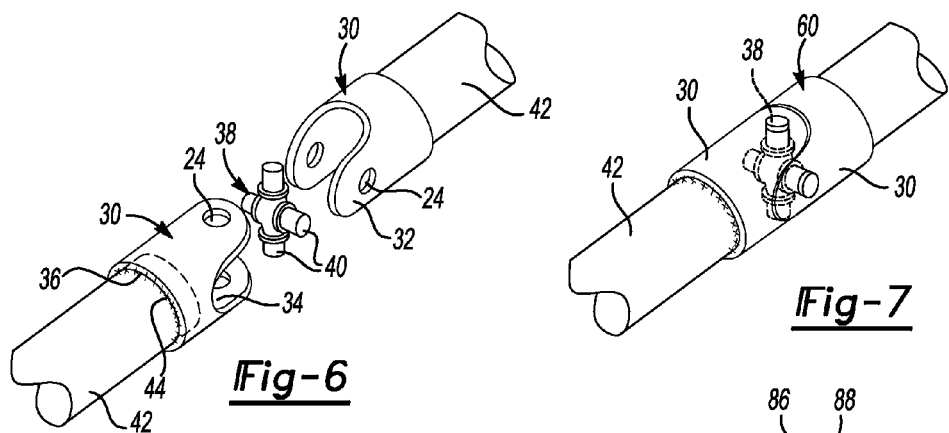
Fig-6
Fig-7
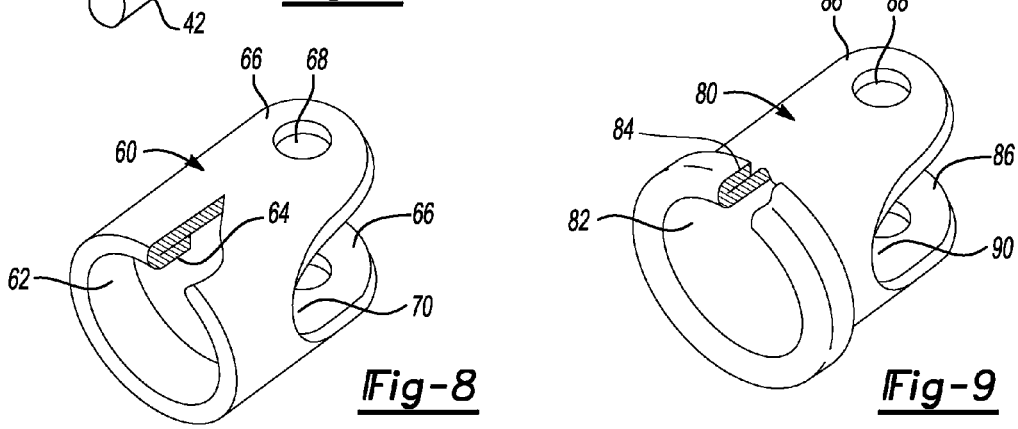
Fig-8
Fig-9

METHOD OF FORMING A UNIVERSAL JOINT

PRIOR APPLICATIONS

This Application claims priority to U.S. Provisional Patent Application 61/524,299, filed on Aug. 16, 2011.

FIELD OF THE INVENTION

This invention relates to a method of forming a universal joint from a steel tube.

BACKGROUND OF THE INVENTION

A universal joint, commonly referred to as a universal coupling, a U-joint, Cardan joint, Hardy-Spicer joint or Hooke's joint is a joint or coupling to a rigid rod that allows the rod to "bend" in any direction and is commonly used for shafts that transmit rotary motion. The joint consists of a pair of hinges or yokes located close together and oriented at 90 degrees to each other, connected by a cross shaft. Universal joints have been used for many hundreds of years and are presently used in many applications, including industrial and automotive. The method of this invention may be used to form a Cardan or double Cardan joint as used, for example, in automotive applications.

At present, the hinge components or yokes of a universal joint are cast and machined. This is an expensive, time consuming process. More importantly, the cast hinge members or yokes typically are not balanced. As will be understood by those skilled in the art, an automotive universal joint must rotate rapidly and if the hinge members or yokes are out of balance, the universal joint will vibrate, sometimes violently or even destructively. Thus, the automotive industry has developed various vibration damping devices to damp the vibration of the universal joint as disclosed, for example, in U.S. Pat. No. 6,520,678. As will be understood, vibration dampers are expensive and also subject to failure.

There is, therefore, a long felt need for a method of making a constant velocity universal joint which is relatively inexpensive, avoids expensive casting and machining operations, reduces weight and results in a balanced universal joint assembly, eliminating the requirement for vibration damping.

SUMMARY OF THE INVENTION

The method of making a constant velocity universal joint or Cardan joint of this invention begins with a tube or a pipe. The tube may be seamless or formed from a metal sheet or plate and welded, forming a welded seam tube. The tube may have constant internal and external diameters including a constant thickness or the tube may be formed to include areas of increased thickness to withstand greater torsional loads. The tube may be formed of any conventional steel including High Strength Low Alloy (HSLA) steels.

After forming the tube, the method of making a universal joint of this invention includes forming a plurality of pairs of coaxially aligned holes at spaced predetermined locations along the longitudinal axis of the tube. Where the yokes or hinge members of the universal joint are cast, it is difficult to retain the cast hinge members during drilling or punching the holes sometimes resulting in misalignment. It is clearly simpler to drill or punch the holes in a continuous pipe or tube.

The next step in the method of forming a universal joint of this invention is cutting the pipe along a curvilinear predetermined cutting path around the holes and forming a pair of projecting arms, each arm including one of the coaxially aligned holes and U-shaped recesses between the arms, thereby forming a plurality of universal joint yokes or hinge members. Another advantage of the method of forming a constant velocity universal joint of this invention is that the same method may be used to form a single or double Cardan joint. In the method of forming a double Cardan joint, both ends of at least two pivot members are cut along a curvilinear cutting path around the holes forming a yoke member having arms projecting from both ends of the tube as described further below.

Finally, the yokes or pivot members are pivotally interconnected by disposing the projecting arms of one yoke member into the U-shaped recesses of the adjacent yoke member and interconnecting the yoke members, typically with a conventional cross member. As set forth above, the method of this invention may be used to form a single universal joint or Cardan joint or a double Cardan joint as disclosed herein.

The method of this invention further includes cutting the tube perpendicular to its longitudinal axis to form the ends of the universal joint. Where a single Cardan joint is formed by the method of this invention, the tube is cut perpendicular to its longitudinal axi between each pair of projecting arms to form the ends of the universal joint. The ends of the universal joint may have increased thickness to withstand greater torsional loads such as by folding over the open ends of the tube and doubling the thickness of the ends of the tube. As set forth above, the method of forming a universal joint of this invention may be adapted to forming a single or double Cardan joint simply by forming intermediate yokes wherein the ends of the hinge members each include projecting arms and U-shaped recesses. The tube may have any length or the tube may be continuous such that the method of this invention is also continuous.

Other advantages and meritorious features of the method of forming a universal joint of this invention will be more fully understood from the following description of the preferred embodiments. As will be understood by those skilled in this art, various modifications and improvements may be made to the method of forming a universal joint of this invention within the purview of the appended claims.

BRIEF DESCRIPTION OF THE DRAWINGS

FIG. 1 is a side perspective view of a pipe or tube which may be utilized to form the universal joint of this invention;

FIG. 2 is a side perspective view of the tube shown in FIG. 1 with the plurality of pairs of coaxially aligned holes formed in the tube;

FIG. 3 is a side perspective view of the tube shown in FIG. 2 with a curvilinear predetermined cutting paths defined on the tube;

FIG. 4 is a side perspective view of the yokes or hinge members following cutting of the tube;

FIG. 5 is a side perspective view of the hinge members of a double Cardan joint formed by the method of this invention;

FIG. 6 is a side perspective view illustrating the pivotal interconnection of the pivot members of a universal joint shown in FIG. 4;

FIG. 7 is a side perspective view of a universal joint formed by the method of this invention; and FIG. 8 is a side perspective view of a pivot member or yoke having a reinforced end portion.

FIG. 9 is a side perspective of an alternative embodiment of the pivot member shown in FIG. 8.

DESCRIPTION OF THE PREFERRED EMBODIMENTS

FIG. 1 illustrates a steel tube or pipe 22 which may be utilized in the method of forming a constant velocity universal joint of this invention. As set forth above, the tube 22 has a longitudinal axis L and, in this embodiment, has a constant external and internal diameter. As set forth above, the tube 22 may be seamless or include a welded seam (not shown). In one preferred embodiment, the next step in the method of forming a universal joint of this invention after forming the tube 22 is to form a plurality of pairs of coaxially aligned holes 24 at spaced locations along and perpendicular to the longitudinal axis L as shown in FIG. 2. That is, two pairs of coaxially aligned holes 24 are formed at predetermined locations along the longitudinal axis L as shown in FIG. 2. The holes 24 may be formed by any suitable means including drilling or punching. Forming the holes 24 in the pipe 22 prior to forming the pivot members or yokes has the advantage that the tube may be easily gripped for drilling or punching. The next step is to define a predetermined curvilinear cutting path 26 defining a pair of opposed projecting arms 32 best shown in FIG. 4 each surrounding one of the holes 24 and a cutting path 28 perpendicular to the longitudinal axis L as shown in FIG. 3. Next, the tube 22 is cut along the curvilinear cutting paths 26 and the cutting path 28 perpendicular to the longitudinal axis L forming a plurality of single hinge members or yokes 30 as shown in FIG. 4, each yoke 30 includes a pair of opposed projecting arms 32, each arm 32 including a hole 24 and a concave U-shaped recess 34 between the arms and an open end 36 cut along the cutting path 28 perpendicular to the longitudinal axis L of the tube. As will be understood, the tube may have any convenient length to form any number of hinge members or yokes.

Alternatively, the method of forming a universal joint of this invention may be used to form a double universal joint or Cardan joint as shown in FIG. 5. In this embodiment, the universal joint assembly includes two end yoke members 46 which may be identical to the single yoke members 30 described above and an intermediate yoke member 48. As described above, the end yoke members 46, each include a pair of opposed projecting arms 50 each arm surrounding a hole 52, and a concave U-shaped curvilinear recess 54 between the projecting arms 50. The intermediate member 48 has a pair of projecting arms 56 projecting from both ends of the intermediate yoke member and U-shaped recesses between the arms as shown in FIG. 5. However, the arms 56 and recesses 58 of the yoke members 46 are turned 90 degrees relative to each other in the intermediate yoke member as shown in FIG. 5. The end yoke members 46 each include an open end 58 as described above.

The next step in forming a universal joint of this invention is to pivotally interconnect the yoke members. FIGS. 6 and 7 illustrate one method of pivotally interconnecting the yoke members 30 of a single Cardan joint. As shown in FIG. 6, the yoke members 30 are turned 90 degrees relative to each other, such that the projecting arms 32 interfit with the concave U-shaped recesses of the adjacent hinge member 30 as shown in FIG. 6. The hinge members are then interconnected in this embodiment by a cross shaft 38 having four perpendicular projecting arms 40 as shown in FIG. 6. One arm 40 is received in each of the holes 24 pivotally interconnecting the single hinge members or yokes 30. In a typical application, a universal joint shaft 42 is received in the open ends 36 of the hinge members and welded as shown at 44. A completed single Cardan universal joint 60 formed by the method of this invention is shown in FIG. 7. As will be understood by those skilled in this art, a double Cardan joint may be formed by interconnecting the end yoke members 46 with one end of the intermediate yoke member 48 using cross shafts such as shown at 38 in FIG. 6 and shafts 42 may be received in the open ends 58 of the end yoke members 46 as described above with respect to FIGS. 6 and 7.

As set forth above, the method of forming a universal joint of this invention may be formed from a steel tube 22 having a constant internal and external diameter. However, the tube 22 may be roll formed to form a tube having increased thicknesses at predetermined area to withstand torsional loads. FIG. 8 illustrates a method of forming a yoke or hinge member 60 having an increased thickness at the open end 62 of the single yoke member 60. The increased thickness is formed by rolling the end 64 of the tube inwardly as shown in FIG. 8, doubling the thickness of the tube at the open end 62 and increasing the torsional strength of the yoke member. That is, a shaft as shown at 42 is received in the open end 62. In this embodiment, the yoke or hinge member 60 may be identical to the end hinge members 30 described above, including a pair of opposed projecting arms 66 each surrounding a hole 68 and a U-shaped curvilinear recess 70 between the arms 66 as described above. FIG. 9 illustrates an alternative embodiment of the hinge member 60 shown in FIG. 8. In the embodiment of the hinge member 80, the free end 84 is folded outwardly over open end 82 doubling the thickness of the open end which receives a rigid rod of the universal joint. In some applications, it is easier to fold the free end 84 outwardly than inwardly. Otherwise the hinge member 80 may be identical to the hinge member 60 including opposed projecting arms 87 each surrounding a hole 88 and a concave U-shaped recess 80 between the arms. It may also be desirable to anneal the hinge member prior to folding to avoid cracking.

Having described preferred embodiments of the method of making a constant velocity universal joint or Cardan joint above, it will be understood that various modifications may be made to the method of this invention within the purview of the appended claims. For example, the tube 22 may be formed by rolling a sheet of steel and welding the adjacent edges by conventional methods, including heating the edges with an induction heater and forging the edges by rolling. The sheet may also be rolled to form predetermined areas having a thickness greater than the remaining areas and the tube thus has thickened areas at predetermined locations, such as the ends of the yokes. As set forth above, the hinge members or yokes formed from a tube are considerably less expensive, lighter in weight and eliminate the requirement for a vibration damper.

What is claimed is:
1. A method of making a universal joint, comprising the following steps:
   forming a tube of high-strength low-alloy steel;
   forming a plurality of pairs of coaxially aligned holes through the unexpanded tube at spaced predetermined locations along the longitudinal axis of the tube;
   cutting the tube along a curvilinear cutting path around the holes forming a pair of projecting arms each arm including one of the coaxially aligned holes and U-shaped recesses between the arms, thereby forming a plurality of universal joint yokes;
   cutting the tube perpendicular to the longitudinal axis of the tube between pairs of coaxially aligned holes to form the open ends of the tube;
   pivotally interconnecting the universal joint yokes with cross shafts each having a rod received into one of the coaxially aligned holes, the projecting arms each extending into one of the U-shaped recesses forming a universal joint; and folding over the open end of the tube along the longitudinal axis thereof, doubling the thickness of the tube at the open end to increase the torsional strength of the universal joint.

2. The method as defined in claim 1, wherein the method includes forming a high-strength low-alloy steel tube having increased thickness at predetermined locations to increase the torsional strength of the universal joint.

3. The method as defined in claim 1, wherein the method includes inserting rigid rods into the open ends of the tube.

4. The method as defined in claim 3, wherein the open ends of the tube have a greater thickness to increase the torsional strength of the universal joint.

5. The method as defined in claim 1, wherein the method includes forming an intermediate yoke member having a pair of projecting arms each including one of the coaxially aligned holes and a U-shaped recess between the arms at both ends of the intermediate yoke member, a pair of end yoke members each having a pair of projecting arms and a U-shaped recess between the arms at one end and an end portion at an opposite end, and pivotally interconnecting an end yoke member to each end of the intermediate yoke member with cross shafts each having a rod received into one of the coaxially aligned holes of the end yoke members and the intermediate yoke member forming a double universal joint assembly.

* * * * *